(12) United States Patent
Friedersdorf et al.

(10) Patent No.: US 7,154,081 B1
(45) Date of Patent: Dec. 26, 2006

(54) COMPOSITE STRUCTURES, SUCH AS COATED WIRING ASSEMBLIES, HAVING INTEGRAL FIBER OPTIC-BASED CONDITION DETECTORS AND SYSTEMS WHICH EMPLOY THE SAME

(75) Inventors: Fritz Friedersdorf, Charlottesville, VA (US); Thomas A. Wavering, Charlottesville, VA (US)

(73) Assignee: Luna Innovations Incorporated, Blacksburg, VA (US)

( * ) Notice: Subject to any disclaimer, the term of this patent is extended or adjusted under 35 U.S.C. 154(b) by 120 days.

(21) Appl. No.: 10/720,694

(22) Filed: Nov. 25, 2003

Related U.S. Application Data

(60) Provisional application No. 60/428,908, filed on Nov. 26, 2002.

(51) Int. Cl.
*G01J 1/42* (2006.01)
*G01J 1/04* (2006.01)
*G01J 5/08* (2006.01)

(52) U.S. Cl. ............................ 250/227.14; 250/227.16; 385/13; 385/37

(58) Field of Classification Search ............ 250/227.14, 250/227.16; 385/10, 12, 13, 37, 73.1
See application file for complete search history.

(56) References Cited

U.S. PATENT DOCUMENTS

| | | | |
|---|---|---|---|
| 4,634,977 A * | 1/1987 | Lenz et al. ............... | 324/244.1 |
| 5,015,859 A * | 5/1991 | Uejio ....................... | 250/358.1 |
| 5,430,817 A | 7/1995 | Vengsarkar | |
| 5,792,284 A | 8/1998 | Cedell et al. | |
| 5,798,521 A | 8/1998 | Froggatt | |
| 5,945,666 A | 8/1999 | Kersey et al. | |
| 6,056,436 A | 5/2000 | Sirkis et al. | |
| 6,265,880 B1 | 7/2001 | Born et al. | |
| 6,545,760 B1 | 4/2003 | Froggatt et al. | |
| 6,559,437 B1 * | 5/2003 | Pope et al. ............. | 250/227.14 |
| 6,784,983 B1 * | 8/2004 | Bjerkan et al. ............. | 356/73.1 |
| 6,888,124 B1 * | 5/2005 | Smith ..................... | 250/227.14 |
| 2003/0127587 A1 | 7/2003 | Udd et al. | |
| 2003/0174924 A1 | 9/2003 | Tennyson | |

* cited by examiner

*Primary Examiner*—Stephone B. Allen
*Assistant Examiner*—Patrick J. Lee
(74) *Attorney, Agent, or Firm*—Nixon & Vanderhye, PC

(57) ABSTRACT

Integral fiber optic-based condition sensors detect conditions of a composite structure, e.g., a coated wire assembly so as to detect damage or conditions that may damage the same. Preferably, at least one optical fiber sensor having a plurality of Bragg gratings written into the fiber at spaced-apart locations along its axial length is integrated into the electrical insulator coating of a wire, wire bundle or wiring harness. The fiber optic sensor may thus be employed to measure the environmental loads on the electrical wiring including stresses from bending, axial loading, pinch points, high temperature excursions and chemical damage. The system is capable of detecting and locating transient conditions that might cause damage to a wiring system or permanent changes in state associated with damage events. The residual stress in the electrical insulator coating of a wire, wire bundle, or wiring harness are used to monitor the evolution of damage by wear or chaffing processes. Detected stress relief on one or more Bragg gratings will thus be indicative of damage to the insulator coating on the conductor. As such, the magnitude of such stress relief may be detected and used as an alert that the wire insulation is damaged to an unsafe extent.

25 Claims, 12 Drawing Sheets

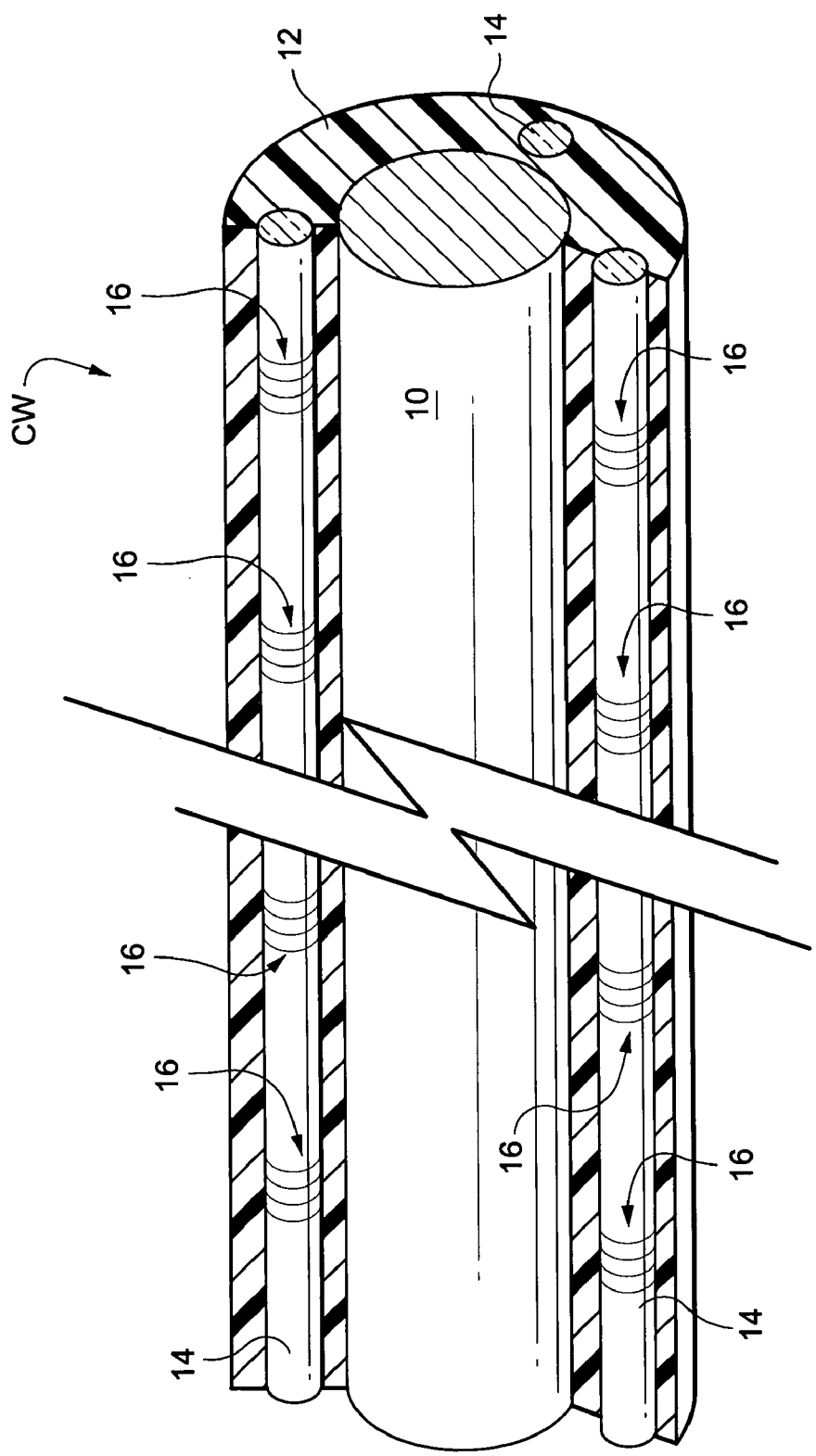

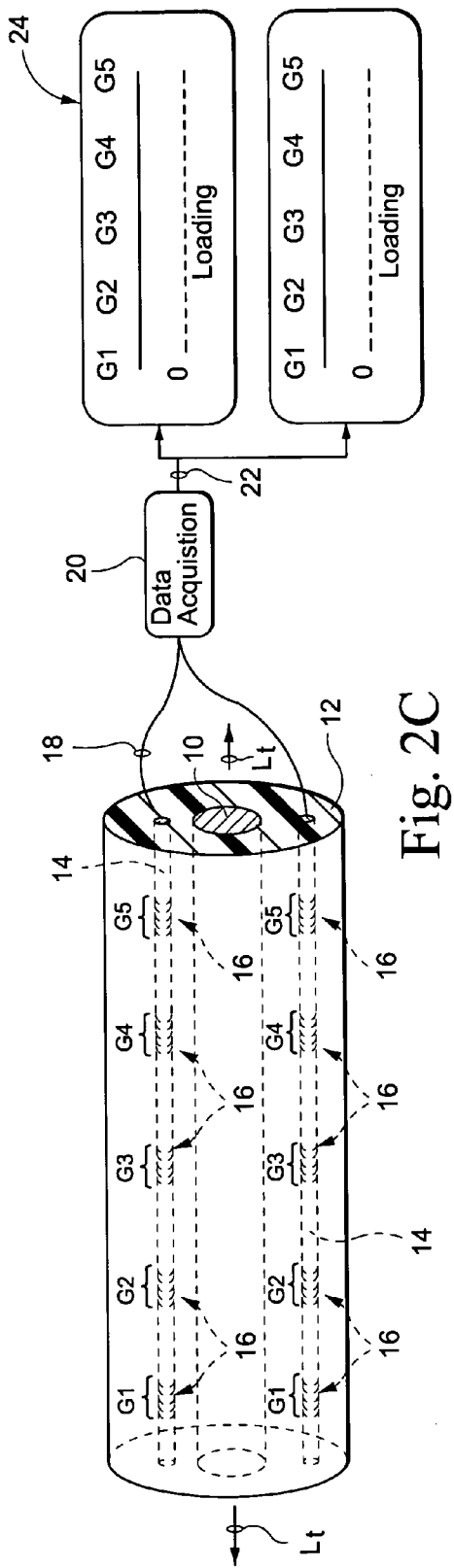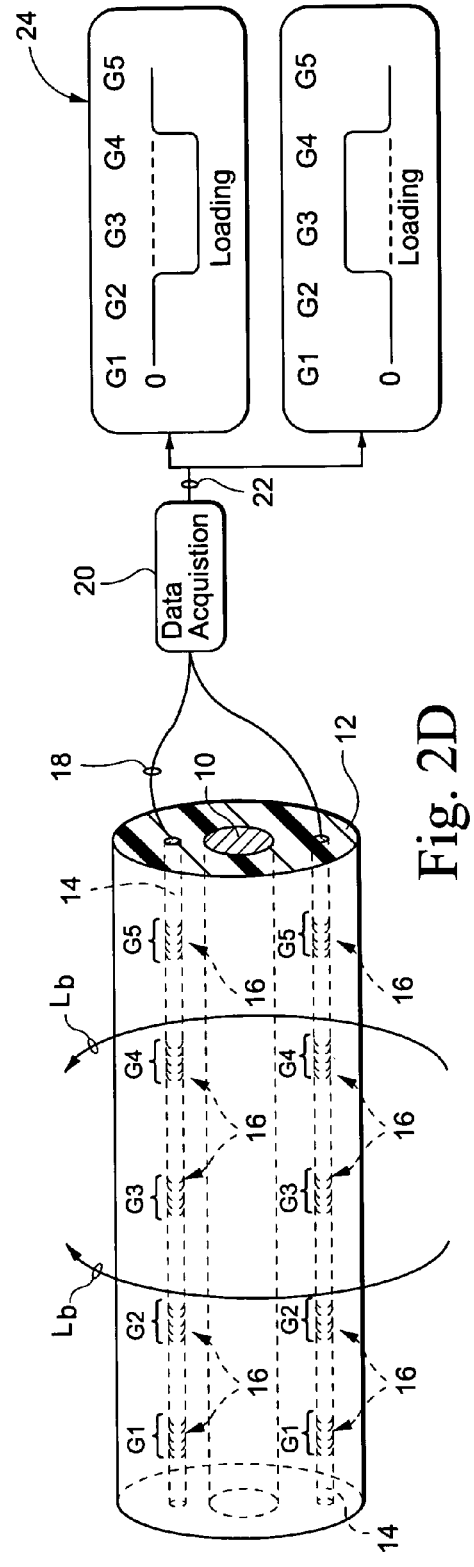

COMPOSITE STRUCTURES, SUCH AS COATED WIRING ASSEMBLIES, HAVING INTEGRAL FIBER OPTIC-BASED CONDITION DETECTORS AND SYSTEMS WHICH EMPLOY THE SAME

CROSS-REFERENCE TO RELATED APPLICATION

This application is based upon, and claims domestic priority benefits under 35 USC §119(e) from, U.S. Provisional Application Ser. No. 60/428,908 filed on Nov. 26, 2002, the entire content of which is expressly incorporated hereinto by reference.

This invention was made with Government support under Contract No. F33615-02-M-2251 awarded by the United States Air Force. The Government has certain rights in the invention.

FIELD OF THE INVENTION

The present invention relates generally to fiber optic condition detection. In especially preferred embodiments, the present invention relates to the detection of damage and/or conditions that may lead to damage in wiring systems. The fiber optic detection provides for the temporal and spatial location of damage or damaging conditions in a wiring system. In preferred forms, the invention is embodied in, and thereby relates to, wiring systems having integral fiber optic-based integrity sensors whereby physical loads, such as tension and bending and thermal transients are continuously monitored. In a most preferred form, the fiber optic-based sensors are bonded and integral to the wiring system such that insulation damage from wear, temperature and or chemical processes are detected. The fiber optic sensing system may be incorporated into the polymer insulation or protective sheath around a single conductor, bundle of conductors or wire harness. In such a manner, actual damage or conditions that increase the potential for damage in a wiring system can be sensed.

BACKGROUND AND SUMMARY OF THE INVENTION

It is highly desirable to detect insulation damage and conditions that lead to insulation damage on electrical conductors in many applications, for example, on aircraft. The detection and location of wire insulation wear may be used to prevent ground faults and electrical arcing which could result in loss of function of electrical systems, fire and catastrophic consequences for the aircraft if left unattended. Ground faults and arcing are difficult to detect because these condition often are intermittent and occur only during operational conditions. The only way to detect insulation and wiring damage that causes intermittent arcing is to have maintenance personnel manually inspect the wiring systems. However, often damaged wiring is hidden and not accessible for visual inspection. Manual inspection has a number of other drawbacks, including human error and inconsistency, accessibility, cost and infrequent inspection intervals and time required for inspection. Also, in many cases further damage of wiring systems is caused by these manual maintenance and inspection activities.

Recently, it has been proposed in U.S. Pat. No. 6,265,880 to Born et al (the entire content of which is expressly incorporated hereinto by reference) to detect chafing of a "conduit" (which may include coated electrical conductors) by means of a sensing element (medium). The sensing element is located such that damage (chaffing) occurs on the sensing element before the conduit. The sensing element described by Born et al may be a conductive wire, waveguide or fiber optical cable. The change in a signal propagated through the sensing element is used to measure chaffing of the conduit. The apparatus and method described by Born et al measures damage to the sensing element only and not the conduit. However, such a prior proposal necessarily depends on the damage to and actual severing of the sensing element. As such, this prior proposal assumes that damage only occurs on the sensing element prior to conduit damage and that the only mechanism is mechanical chaffing. It is known, however, that damage to electrical systems may be due to high temperature transients, tension, bending, pinch points and chemical contamination. The prior proposal does not provide for the detection of those conditions that may lead to damage of the conduit, but instead provides for detection only of actual chaffing damage to the sensor.

Furthermore, the Born et al technique requires that, once damage is detected and the sensing fiber is severed, the only way to restore sensor function is replacement of the sensor and conduit assembly. This is a cost prohibitive and time consuming response for a system intended to reduce maintenance time and cost. It is well know that intrusive wiring replacement activities are damaging to other collocated wiring elements and systems. Therefore, safety improvements associated with the prior Born et al proposal may be negated by increased sensor maintenance demands.

Prior art sensing methods and apparatus are not sensitive to many processes that cause wire damage. These prior art methods only detect chaffing damage to the sensing elements. Once damaged, restoration of function requires substantial time, effort and cost for system replacement and is a safety liability because of the potential for collateral damage to collocated systems.

An objective, optical fiber-based distributed sensor system having the ability to monitor the magnitude of physical, thermal and other environmental loadings on the wiring system that are conditions that lead to damage would be desirable. A further objective, optical fiber-based distributed sensor system that is capable of monitoring insulation wear or permanent damage to the wiring system would be desirable.

An objective, optical fiber-based distributed sensor system that can be used to continuously monitor the wiring system and provide both temporal and spatial resolution of the wiring system condition and damage would likewise be highly desirable. In this regard, it would be a desirable objective to have an optical fiber-based distributed sensor system that could monitor potentially damaging conditions and damage to the wiring system without loss of function of the sensing system. A desirable objective would also be the ability to detect and locate damaging conditions before permanent wiring system damage occurs and that can be corrected without loss of function of the optical fiber-based distributed sensor system. Another objective would be the detection and location of permanent wiring system damage that could be repaired without loss of function or replacement of the optical fiber-based distributed sensor system.

A fiber optic based sensor system which could quickly locate regions of excessive wear and/or regions where conditions are possible for excessive wear to occur would therefore be highly desirable. It is towards meeting such objectives and to overcome the drawbacks of the prior art that the present invention is directed.

Broadly, the present invention is embodied in wiring systems (e.g., individual wires, wire bundles, wire harnesses and the like) having integral fiber optic-based integrity sensors, and to systems and methods for detecting high temperature excursions and strains that can cause damage of a protective insulator coating on an electrical conductor. The present invention is also directed to systems and methods for locating permanent damage of insulators and protective coatings for electrical conductors. In especially preferred forms, the present invention is embodied in an optical fiber sensor in operative association with the wiring system, wherein the optical fiber sensor includes a plurality of Bragg gratings written into the fiber at spaced-apart locations along its axial length.

The fiber optic sensor used in the practice of the present invention may thus be employed to measure the strain and temperature of an electrical wire, wire bundle or harness assembly. The fiber optic sensor may be employed to detect and locate permanent changes in the state of strain of the wire, wire bundle, harness and electrical insulator coating. The optical fiber may be contained in a polymer sheath, coating, weave, tape wrap or simply co-located in a wire bundle or harness assembly. These physical and environmental loadings produce measurable strains in fiber optic sensors which include Bragg gratings written therein. The sensor may thus be operatively connected to circuitry which detects such permanent and transient strain and thermal loadings which may thereby be indicative of conditions that lead to damage or permanent damage to regions along the axial length of the electrical wiring system, wire bundle, harness or insulator coating.

Further, the fiber optic sensor used in the practice of the present invention may thus be employed to measure the residual stress in an electrical insulator coating of a metallic electrical conductor (e.g., an electrically conductive wire) wire bundle or wire harness. In this regard, electrical insulator coatings, typically formed of a polymeric material (e.g., polyolefin, polytetrafluoroethylene, fluorinated ethylene propylene, polyvinylidene fluoride, ethylene-tetrafluoroethylene, polyimide or the like) produce measurable strains in fiber optic sensors which include Bragg gratings written therein. The sensor may thus be operatively connected to circuitry which detects such stress which may thereby be indicative of insulator coating wear regions along the axial length of the electrical wiring system, wire bundle or harness.

The magnitude of the compressive strain in the fiber optic sensor decreases as the coating is worn away. Measured strains in the Bragg grating may thus be used in accordance with the present invention so as to monitor the progression of the wear processes. In such embodiments, the optical fiber sensors could thereby function as wear sensors capable of being multiplexed using a number of known art techniques, including optical frequency domain reflectometry.

The complete sensor system may therefore include multiple optical sensor fibers that are functionalized to detect or have varying sensitivities to residual insulation stress, tensile stress, bending stress, temperature and/or magnetic field strength. A fiber optic sensor with minimal or no adhesion to the insulating material can be used to facilitate thermal compensation. Isolation of such second sensor from residual insulation stress will therefore make it primarily responsive to temperature conditions. Locating fibers at various circumferential positions about the axis of the wiring system enhances the detection of tensile, bending and pinching loads. Coatings of varying coefficients of thermal expansion may be used to tailor the temperature response of the fiber optic sensor.

Furthermore, the optical fiber sensors may be functionalized so as to be responsive to magnetic field strength. Magnetic sensitivity is achieved by adhering coatings that contain magnetostrictive particles to the optical fiber sensors. A system comprised of magnetostrictive particles and organic binder that may be employed in the practice of the present invention is more fully disclosed in U.S. Pat. No. 5,792,284 to Cedell et al, the entire content of which is expressly incorporated hereinto by reference. Such magnetostrictive materials may thus be employed as a coating in the context of the present invention so that strain is induced when subjected to a magnetic field. Such induced strain may thus be detected by the fiber optic condition sensors employed in the present invention.

Systems which employ the present invention may therefore find particular utility as an aircraft condition sensor which could be monitored continuously on-board and/or monitored periodically during maintenance inspections by ground maintenance personnel.

These and other objects and advantages of the present invention will become more clear to those skilled in this art after careful consideration is given to the following detailed description of the preferred exemplary embodiments thereof.

BRIEF DESCRIPTION OF THE ACCOMPANYING DRAWINGS

Reference will hereinafter be made to the accompanying drawings wherein like reference numerals through the various FIGURES denote like structural elements, and wherein FIG. 1A is a schematic representation of an exemplary wire assembly of the present invention having an integral fiber optic-based damage detector wherein an electrically conductive wire element includes circumferentially spaced-apart fiber optic sensors in operative association with the conductor's electrical insulator coating;

FIG. 1B is a schematic representation of another exemplary wire assembly which includes an electrically conductive wire bundle or harness assembly comprised of multiple individual electrically conductive wire elements having an integral fiber optic-based damage detector which includes circumferentially spaced-apart fiber optic sensors in operative association with the protective electrical insulator coating or jacket that sheaths the wire bundle or harness assembly;

FIG. 1C is a schematic representation of another exemplary wire assembly which includes an electrically conductive wire bundle or harness assembly having a collocated fiber optic-based damage detector of the present invention in operative association with the wire bundle or harness assembly;

FIGS. 2A–2E schematically depict a wiring system which employs a wire element having an integral fiber optic-based sensor to detect damage and conditions that may lead to damage, and showing possible signal responses associated with such states;

DETAILED DESCRIPTION OF THE INVENTION

I. Definitions

Figure 1B:
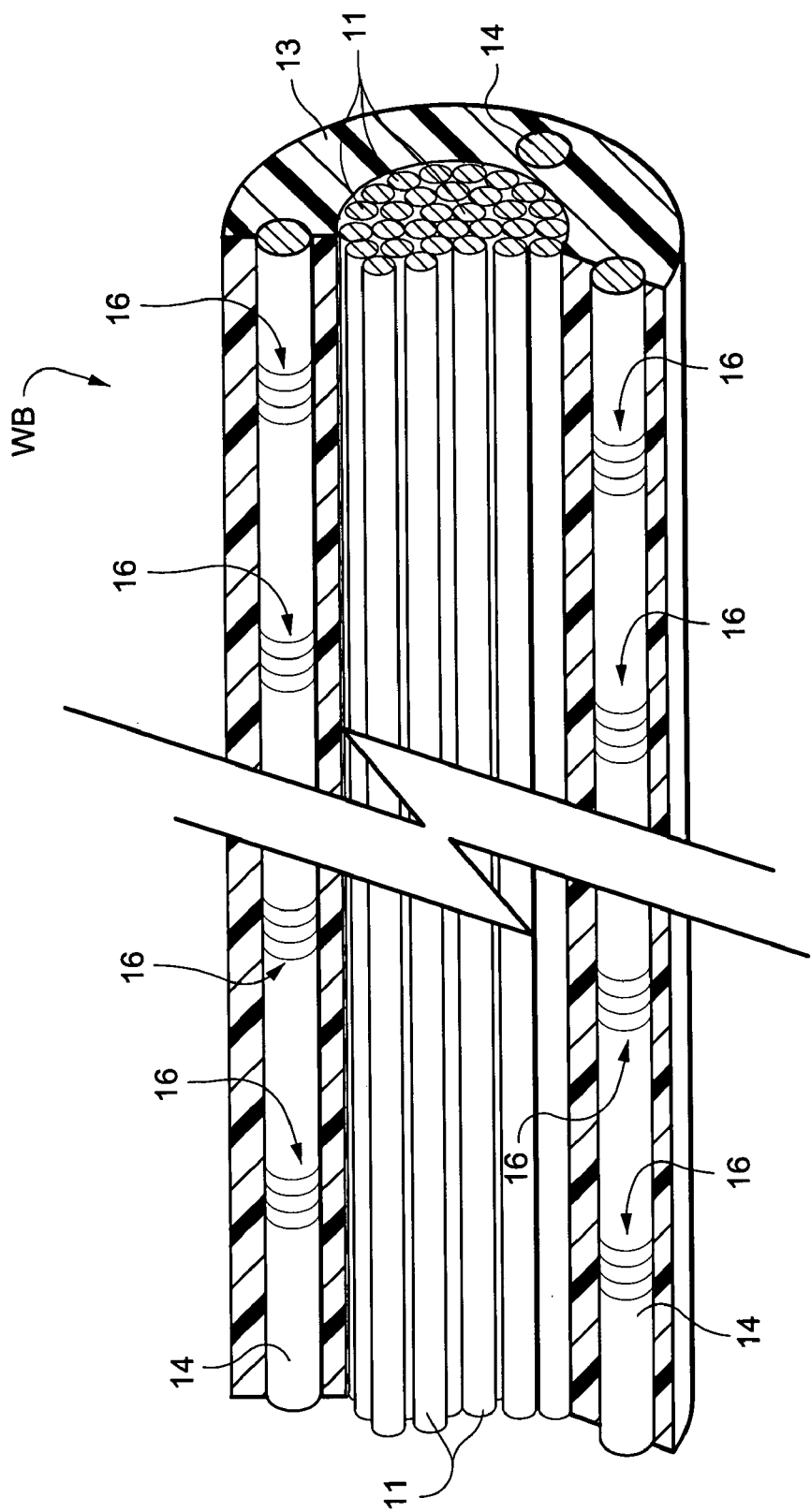

As used herein and in the accompanying claims, the following terms have the following meanings.

A "fiber optic condition sensor" means an optical fiber which is capable of being analyzed spectrally so as to detect at least one of strain displacement, temperature or other physical quantities at locations along the optical fiber's length of an element with which the sensor is associated. Exemplary fiber optic condition sensors that may be employed in the practice of this invention include grating-type (e.g., long period and/or Bragg gratings), interferometric-type and back-scattering type sensors as disclosed, for example, in U.S. Pat. No. 6,545,760 to Froggatt et al; U.S. Pat. No. 5,945,666 to Kersey; U.S. Pat. No. 5,430,817 to Vengsarkar; U.S. Pat. No. 5,798,521 to Froggatt, and U.S. Pat. No. 6,056,436 to Sirkis et al; U.S. Patent Application Publication Nos. US 2003/0174924 A1 to Tennyson, and US 2003/0127587 to Udd et al, and pending U.S. Patent Application Ser. No. 09/548,972 to Wavering et al filed on Apr. 13, 2000 (now U.S. Pat. No. 6,671,055), the entire content of each being expressly incorporated hereinto by reference.

An "element" in need of condition detection can be virtually any structure with which the fiber optic condition sensor may be operatively associated and used so as to detect conditions thereof. Such elements may therefore be coated structures such as coated wires or wire bundles, as well as pipes, hoses, tubes or other conduits.

II. Description of the Preferred Embodiments

Accompanying FIG. 1A depicts schematically a coated wire assembly CW in accordance with the present invention which comprises an integral fiber optic-based damage detector. As is conventional, the coated wire CW includes at least one electrically conductive wire element 10 which is surrounded entirely by an electrically insulated sleeve 12. The insulator sleeve 12 covers the wire element 10 along its entire axial length (which is usually of an extreme or indefinite length). Important to the present invention, the coated wire CW integrally includes a plurality of fiber optic sensors 14 in operative association with the insulator sleeve 12. As shown in the embodiment of FIG. 1A, each of the fiber optic sensors is provided with a series of in-fiber Bragg gratings 16 spaced-apart along the optical fiber's axial length.

The wire element 10 may be formed from any conventional electrically conductive material. Most preferably, the wire element is in the form of a monofilamentary or multifilamentary wire, roving or braid formed of an electrically conductive metal or metal alloy. The wire element 10 will typically be of extreme or indefinite length and the annular electrical insulator sleeve 12 will thus be continuously formed around the conductor along its entire length.

Any conventional electrically insulating material may be employed as the electrical insulator sleeve 12 which coats the conductor 10. Usually, the insulator sleeve 12 will be formed of a pliable polymeric material, such as a polyolefin, polytetrafluoroethylene, fluorinated ethylene propylene, polyvinylidene fluoride, ethylene-tetrafluoroethylene, polyimide or the like.

Accompanying FIG. 1B depicts schematically a wire bundle WB comprised of a plurality of coated wires 11 and an integral fiber optic-based damage detector. The wire bundle WB is in and of itself conventional in that it includes an assembly of individual insulated electrical conductors 11 which are surrounded entirely by a protective insulating jacket or sheath 13. The coated wires 11 may be formed from any conventional electrically conductive material with insulation. The protective jacket 13 covers the electrical conductors 11 along their entire axial length (which is usually of an extreme or indefinite length). Important to the present invention, the wire bundle WB integrally includes a fiber optic damage detector comprised of a plurality of fiber optic sensors 14 in operative association with the protective jacket 13. Each of the fiber optic sensors 14 is provided with a series of in-fiber Bragg gratings 16 spaced-apart along the fiber's axial length.

Any conventional jacket or sheath may be employed as the protective insulation 13 which contains the electrical wires 11 that comprise the wire bundle. Usually, the protective insulation 13 will be formed of a pliable polymeric material; such as a polyolefin, polytetrafluoroethylene, fluorinated ethylene propylene, polyvinylidene fluoride, ethylene-tetrafluoroethylene, polyimide or the like. The protective insulation may be a tape wrap, woven sleeve or extruded jacket.

Important to the present invention, the WB integrally includes a fiber optic damage detector comprised of a plurality of fiber optic sensors 14 in operative association with the protective jacket 13. As shown in the embodiment of FIG. 1B, each of the fiber optic sensors 14 is provided with a series of in-fiber Bragg gratings 16 spaced-apart along the fiber's axial length.

Figure 1C:
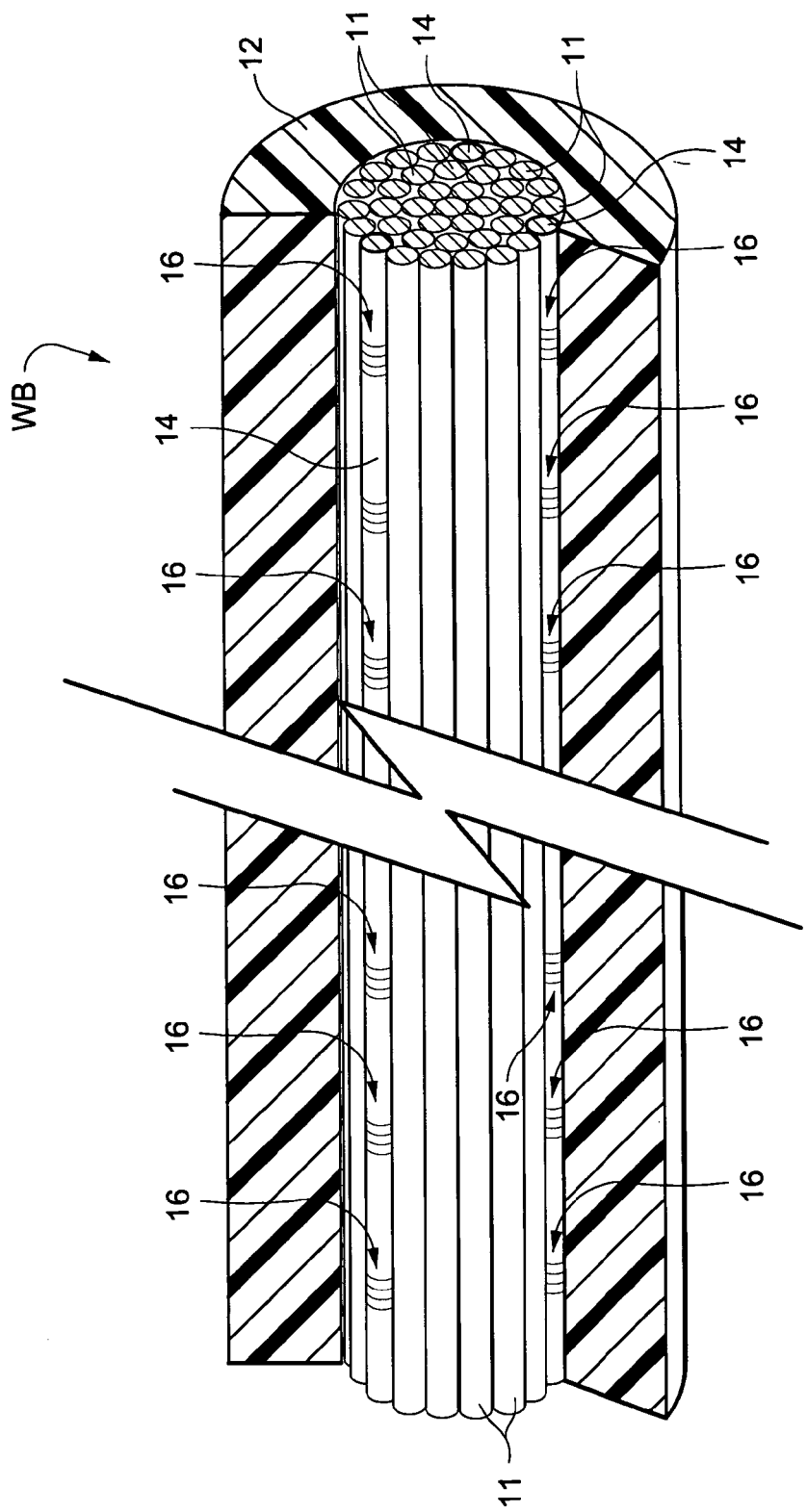

Accompanying FIG. 1C depicts schematically another possible embodiment of a wire bundle WB' of coated wires in accordance with the present invention which comprises an integral fiber optic-based damage detector. In this regard, the wire bundle WB' depicted in FIG. 1C is structurally similar to the wire bundle WB depicted in FIG. 1B, with the principal exception being that the fiber optic sensors 14 with in-fiber Bragg gratings 16 are co-located physically at desired locations within protective jacket 13 surrounding the plural wires 11 forming wire bundle WB', instead of being positioned physically within the sleeve 12. As such, the wires 11 and sensors 14 are both surrounded physically and protected by the jacket 13.

As is conventional, each of the Bragg strain gratings 16 is written on a discrete section of the optical fiber 14 and comprise a portion of the optical fiber where the index of refraction varies with a given periodicity. Optical radiation is transmitted over a plurality of contiguous predetermined wavelength ranges. The optical radiation reflects off the fiber optic Bragg gratings. As the grating spacing changes in response to strain or temperature, the wavelength of the reflected optical radiation changes. The strain on the individual gratings distributed over the length of optical fiber is determined by the difference between the current wavelength an earlier baseline wavelength measurement. In addition to strain, the Bragg grating spacing may change in response to other environmental factors, such as temperature. One optical fiber sensor and system that may be satisfactorily employed in the practice of the present invention is described more fully in U.S. Pat. No. 5,798,521 to Froggaft.

The optical fiber sensors 14 are shown in the embodiment of FIGS. 1A and 1B as being embedded physically within the annular electrical insulator sleeve 12 or protective sheath 13, respectively. The sensors 14 may be incorporated into the insulator sleeve 12 or protective sheath 13 in any convenient manner and/or by any convenient means (e.g., via adhesive bonding). It will also be understood that the insulator sleeve 12 or protect sheath 13 containing the optical fiber sensor 14 may be any conventional covering including, but not limited to, extrusion coatings, tape wraps and/or woven covers. Furthermore, it will be understood that the sensors 14 may be associated with the insulator 12 in virtually any geometry, such as a spiral winding around the conductor 10 and/or oriented substantially parallel to the insulator 12 (e.g., as depicted in FIGS. 1A and 1B).

The optical fiber sensors 14 shown in the embodiment of FIG. 1C are collocated physically within the WB contained in the protective sheath 13. However, the sensors 14 may not be affixed to the electrical wires 11 or the protective sheath 13. Similar to the embodiment of FIGS. 1A and 1B, the sensors 14 may be associated with the WB in virtually any geometry, such as a spiral winding around the bundle of electrical wires 11 and/or oriented substantially parallel to the electrical wires 11 as depicted in FIG. 1C.

Important to the present invention is the functionality of the fiber optic sensors 14 for detection of specific loading and damage modes on the coated wire element CW or wire bundle WB. Important to the present invention are the residual stresses that are present between the fiber optic sensors 14 and the insulator sleeve 12/protective jacket 13. Also of importance are the changes and occurrence of residual stresses between the fiber optic sensors 14 and the insulator sleeve 12/jacket 13. These residual stresses are developed by the adhesion of the sensors 14 to the insulator sleeve 12/jacket 13. Residual stress can be produced by the relative coefficients of thermal expansion (CTE) of the insulator sleeve 12/jacket 13 and the optical fiber sensor 14 or from dimensional changes in the insulator sleeve 12/jacket 13 during curing. Mismatch of the CTE of the insulator sleeve 12/jacket 13 adhered to the optical fiber sensor at an elevated temperature induces a residual stress which is exerted upon the sensor 14 when cooled. When the insulator sleeve 12/jacket 13 becomes worn and/or damaged by mechanical, chemical or thermal loading, this induced stress is changed somewhat (e.g., due to a decrease of the material thickness of the insulator when the insulator sleeve 12/jacket 13 is worn). It is the change of the induced stress which, according to the present invention, can then be sensed as damage of the insulator sleeve 12/jacket 13. Most preferably, it is desirable to achieve a wavelength change in the Bragg grating 16 when adhered to or embedded within the insulator sleeve 12/jacket 13 which is greater than about 0.1 nm, and more preferably greater than at least about 1.0 nm up to about 4.0 nm (e.g., between about 2.2 nm to about 2.6 nm) relative to the wavelength of the initial zero state of the Bragg grating prior to being adhered to or embedded within the insulator.

The adhesion of the optical fiber sensor 14 to the insulator sleeve 12/jacket 13 is also an important design criteria. Specifically, when the insulator sleeve 12/jacket 13 is permanently damaged by plastic deformation or otherwise dimensionally changed due to any combination of mechanical, chemical or thermal loading the adhered optical fiber sensor 14 will have a new detectable strain state.

The response of the optical fiber sensor 14 to temperature may be employed in accordance with the present invention so as to detect potential damage events. The temperature response of the optical fiber sensor 14 is dependent on the CTE of the optical fiber and the CTE of any material adhered to the sensor 14. The temperature response will be principally a function of the optical fiber sensor 14 alone for the embodiment shown in FIG. 1C, of the fiber sensor 14 and insulator coating 12 couple in the embodiment of FIGS. 1A and 1B.

Applied mechanical loads may be detected by the coated wire CW and wire bundle WB embodiments depicted in FIGS. 1A–1C. These mechanical loads are primarily axially applied stresses, bending moments and/or localized pinch points. The optical fiber sensors 14 are sensitive to external applied mechanical loads on the CW and WB. The fiber optic sensor arrangements of FIGS. 1A–1C produce responses that are proportional to the magnitudes of the applied loads.

Permanent changes in state may be detected by the coated wire CW and wire bundle WB embodiments depicted in FIGS. 1A–1C. These changes in state may be due to the presence of accumulated damage or loading of the coated CW and wire bundle WB. The sensor output provides the means to locate the region along the coated wire CW and wire bundle WB that has a new load state or damage. The new state or damage can be measured relative to any previously recorded condition. And the new state or damage condition can be used as a benchmark for characterizing any future changes in damage or condition of the coated wire CW and wire bundle WB.

Figure 2A:
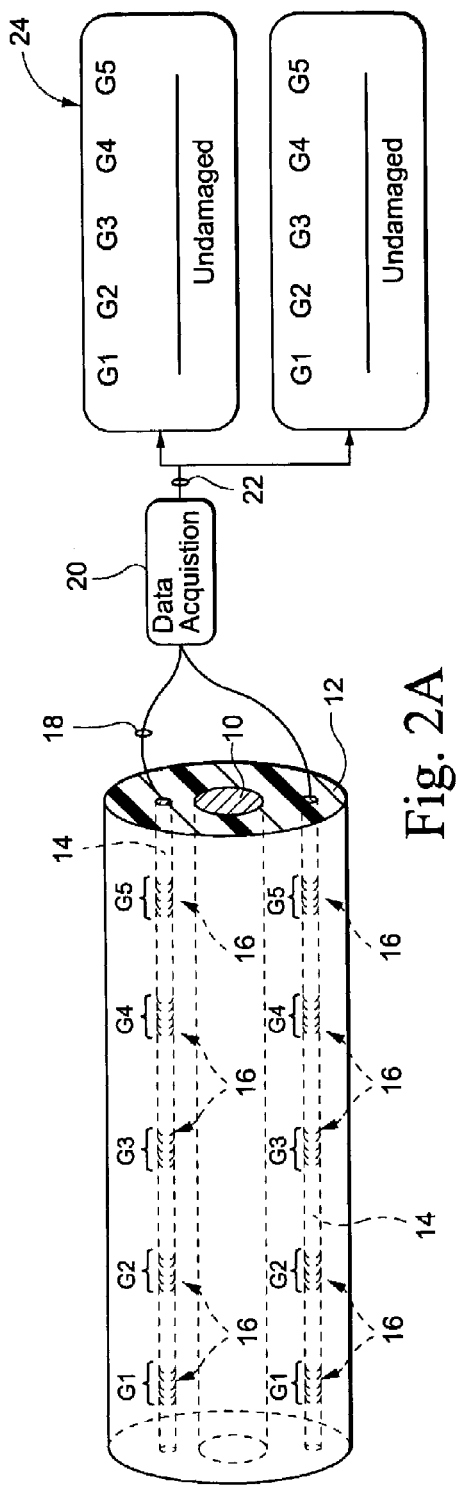
Figure 2B:
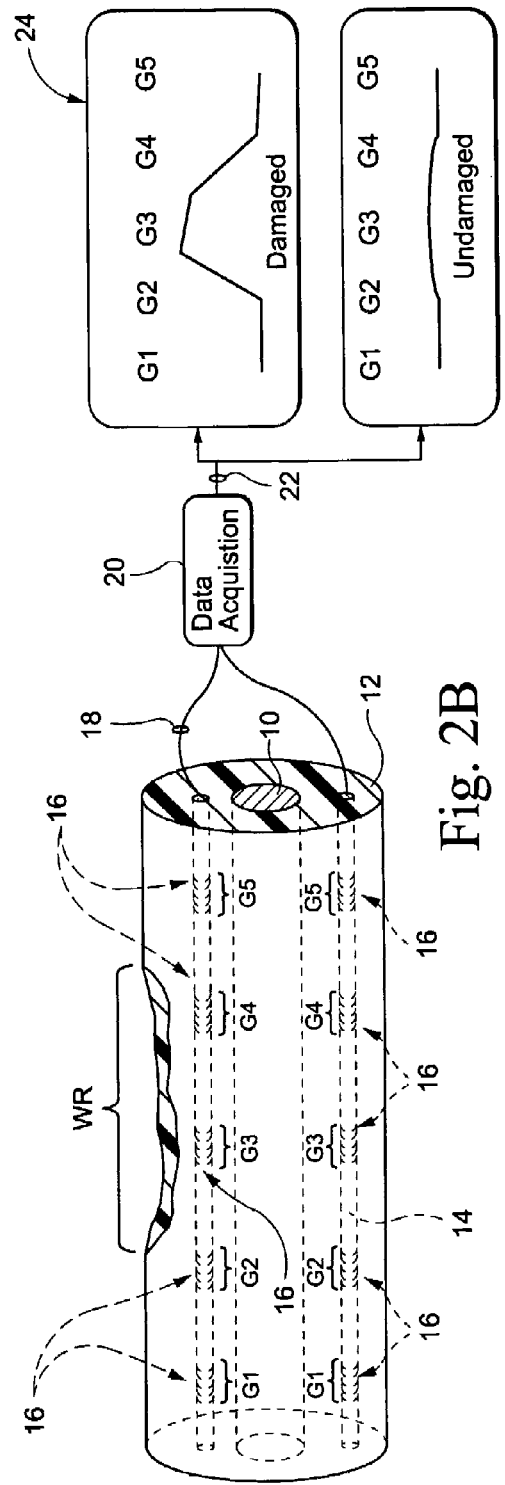

Accompanying FIGS. 2A, and 2B schematically depict detection system response to damage and potentially damaging conditions of the present invention employing a fiber optic-based sensor 14 as described generally above with reference to FIGS. 1A and 1B. Specifically, FIG. 2A shows schematically a possible signal response associated with the CW being in an undamaged unloaded state, whereas FIG. 2B shows schematically a possible signal response associated with the electrical insulator 12 being in a damaged or worn state. In this regard, a region of insulation wear WR causes a portion of the insulator 12 to be physically removed thereby changing the strain in the optical fiber sensor 14. This strain change in the optical fiber sensor 14 thus causes a shift in the reflected wavelength of one or more of the Bragg gratings 16 in the vicinity of the wear region WR. A change in the strain state relative to an initial zero state is sensed by a system 20 described (e.g., as described more fully in U.S. Pat. No. 5,789,521) which is operatively connected to the fiber optic sensor 14 via standard optical cable 18. The system 20 may employ any conventional elements of data acquisition and signal processing well known to those familiar with the art and described in order to sense, store and output the changes in the strain state of the optical fiber sensor 14. The response to detection of a change in the strain state in the data acquisition system 20 may output an appropriate signal 22 to a monitor 24 which is capable of displaying visually and/or providing an aural warning of the detected change in state event. For example, in FIG. 2B, the monitor 24 displays a visual indication that a wear region WR in the insulator 12 has occurred between Bragg gratings G2 and G4. Alternatively or additionally, the data may be stored electronically.

Accompanying FIG. 2C shows schematically a possible signal response associated with the coated wire CW being subjected to a tension load $L_t$. In this regard, the tensile load $L_t$ on the coated wire CW produces strain in the optical fiber sensors 14. This strain change in the optical fiber sensor 14 thus causes a shift in the reflected wavelength of the Bragg gratings 16 within the strained length of CW. For example, in FIG. 2C, the monitor 24 displays a visual indication that a tensile stress in CW is present over Bragg gratings 16 G1 to G5.

Accompanying FIG. 2D shows schematically a possible signal response associated with the coated CW being loaded under bending moments $L_b$. In this regard, the bending load $L_b$ on the coated CW produces both a tensile and compressive strain in the optical fiber sensors 14. This strain change in the optical fiber sensors 14 thus causes a shift in the reflected wavelength of the Bragg gratings 16 within the strained length of the coated wire CW. For example, in FIG. 2D, the monitor 24 displays a visual indication that a bending stress in CW is present over Bragg gratings 16 G2 to G4.

Figure 2E:
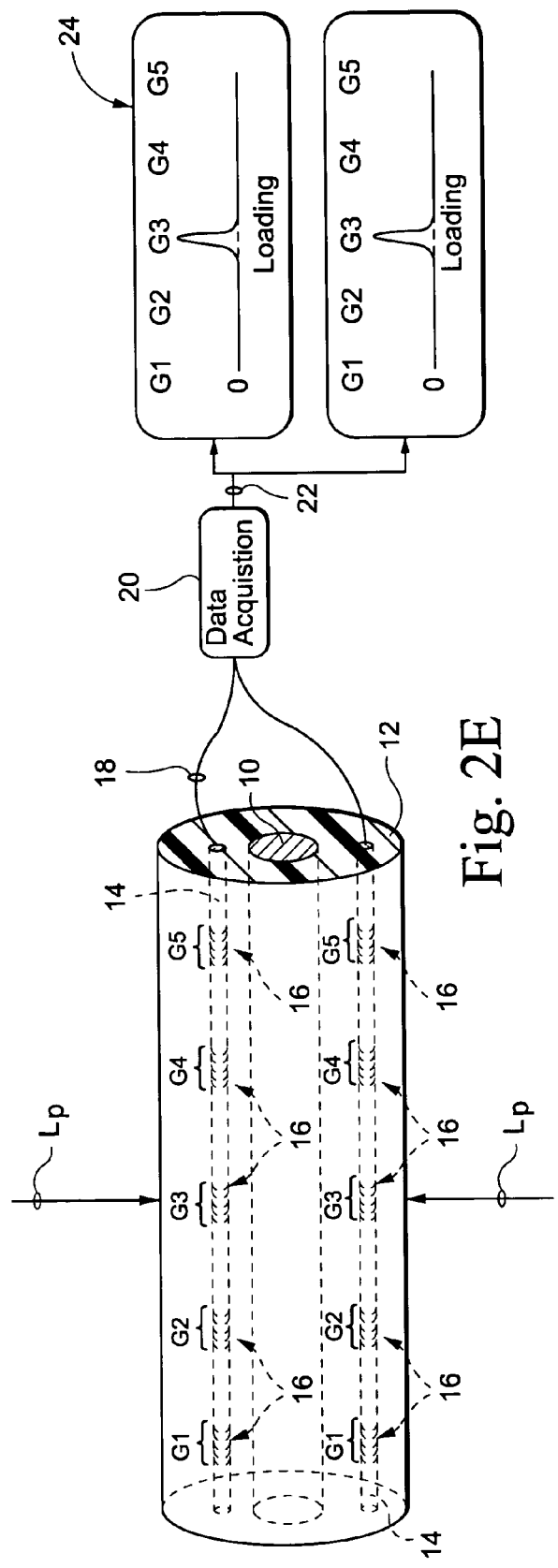

Accompanying FIG. 2E shows schematically a possible signal response associated with the coated wire CW being subject to a pinching load $L_p$. In this regard, the pinch load $L_p$ on the coated wire CW produces a localized axial tensile strain in the optical fiber sensors 14. This strain change in the optical fiber sensors 14 thus causes a shift in the reflected wavelength of the Bragg gratings 16 within the strained length of the coated wire CW. For example, in FIG. 2E, the monitor 24 displays a visual indication that a pinching force in CW is present over Bragg gratings 16 G3.

It will of course be understood that, although a coated wire CW shown in FIG. 1A has been depicted in FIGS. 2A–2E, such a depiction is exemplary only and non-limiting to the present invention. Thus, a similar function may be achieved using the wire bundle WB depicted in FIGS. 1B and 1C.

Figure 3:
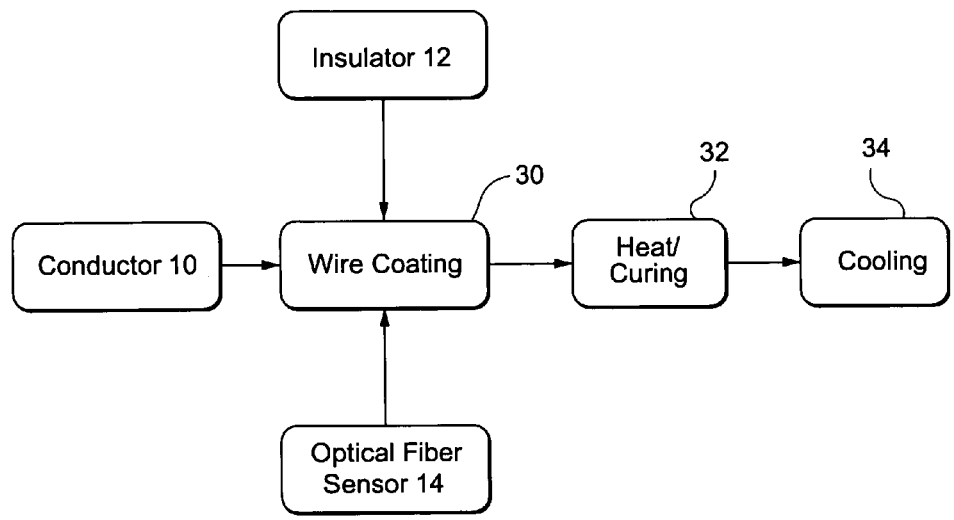
FIGS. 3–7 are schematic representations of possible methods of making wire elements having a fiber optic-based sensor of the present invention.

FIG. 3 depicts one exemplary manner in which a fiber optic based damage detector may be made. In this regard, electrical conductor 10 may be advanced into a wire coating step 30 concurrently with the material to form the coating insulator 12 and the optical fiber sensor 14. As is conventional, the insulator material is extruded or otherwise applied continuously about the circumference of the conductor 10 along its entire axial length. While in such a softened state, one or more of the optical fiber sensors 14 may be embedded within the insulator 12. Following coating in the coating step 30, the insulator 12 may be cured (e.g., via convection, induction, or infrared heating techniques and/or via ultraviolet and electron beam radiation techniques), if needed, in step 32, and then allowed to cool in step 34 if needed.

Figure 4:
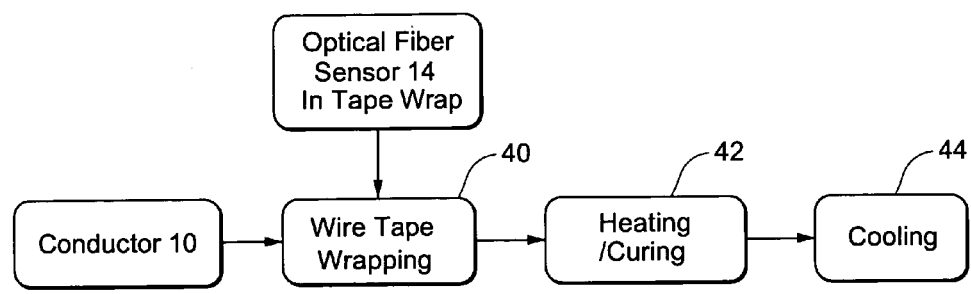

FIG. 4 depicts another preferred technique for making a fiber optic based damage detector. As shown, the optical fiber sensor 14 may be incorporated into a tape of electrical insulator 14 which is wrapped around the conductor in step 40. The thus insulator tape-wrapped conductor is then heated and/or cured (e.g., via convection, induction, or infrared heating techniques and/or via ultraviolet and electron beam radiation techniques) in step 42 followed by cooling in step 44. The tape containing the optical fiber sensor 14 forms a continuous insulating coating around the conductor 10.

Figure 5:
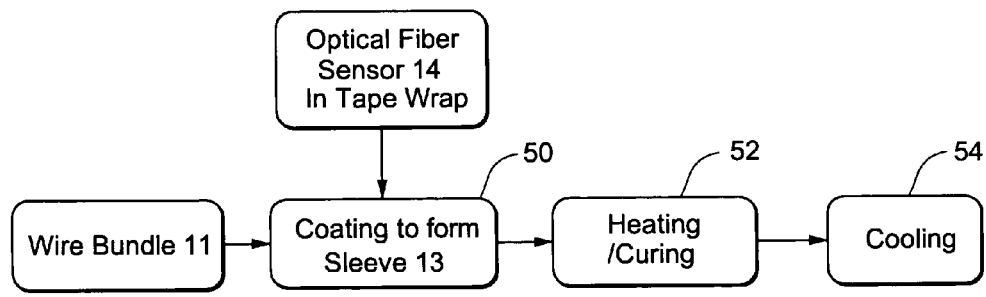

FIG. 5 depicts another exemplary manner in which a fiber optic based damage detector may be made. In this regard, wire bundle 11 may be advanced into a coating step 50 concurrently with the material to form the protective sleeve 13 and the optical fiber sensor 14. As is conventional, the insulator material is extruded or otherwise applied continuously about the circumference of the wire bundle 11 along its entire axial length. While in such a softened state, one or more of the optical fiber sensors 14 may be embedded within the protective sleeve 13. Following coating in the coating step 50, the protective sleeve 13 may be cured (e.g., via convection, induction, or infrared heating techniques and/or via ultraviolet and electron beam radiation techniques), if needed, in step 52, and then allowed to cool in step 54 if needed.

Figure 6:
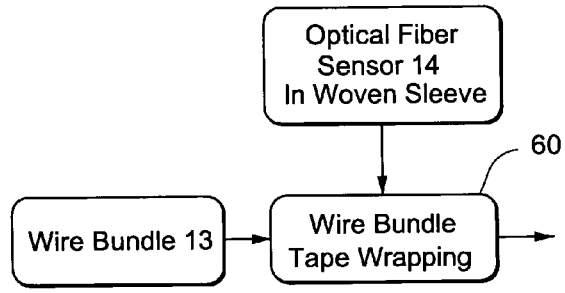

FIG. 6 depicts another preferred technique for making a fiber optic based damage detector. As shown, the optical fiber sensor 14 may be incorporated into a woven protective sleeve 13 which is used to cover the wire bundle in step 60. The woven sleeve containing the optical fiber sensor 14 forms a continuous protective sleeve around the wire bundle 13.

Figure 7:
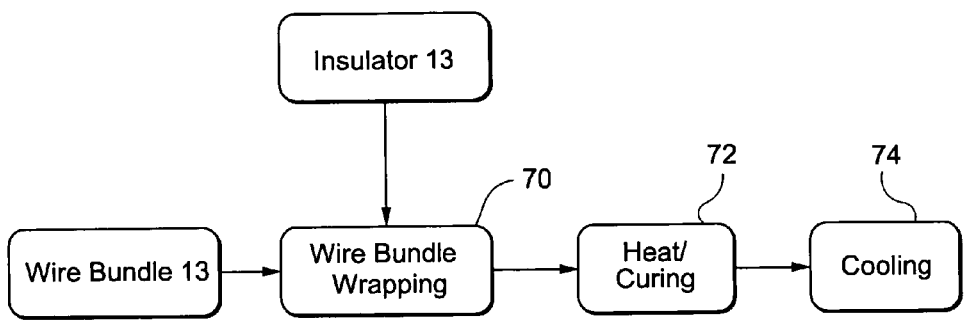

FIG. 7 depicts another preferred technique for making a fiber optic based damage detector. As shown, the optical fiber sensor 14 may be incorporated into a tape of protective sleeve 13 which is wrapped around the wire bundle in step 70. The thus protective tape-wrapped bundle is then heated and/or cured (e.g., via convection, induction, or infrared heating techniques and/or via ultraviolet and electron beam radiation techniques) in step 72 followed by cooling in step 74. The tape containing the optical fiber sensor 14 forms a continuous protective sleeve around the wire bundle 13.

The present invention will be further described by reference to the following non-limiting Examples.

EXAMPLES

Example 1

Residual stresses were produced between an insulating polyolefin tube and an optical fiber sensor. Wire insulation was simulated by semi-rigid adhesively lined polyolefin heat shrink tubing (3M Corporation). Initial wire insulation tests were conducted using the FiberPro™ system (Luna Innovations) to monitor single optical fiber Bragg gratings. The fiber was cleaned with isopropyl alcohol and then a thin coating of cyanoacrylate adhesive was applied to promote adhesion between the fiber and the polyolefin tubing. The fiber grating was then placed into the adhesively lined polyolefin tubing. A heat gun was used to shrink the tubing and melt the thermoplastic adhesive lining. At the peak temperature, the tubing was compressed to push entrapped air out of the tube and fully wet the fiber with the thermoplastic adhesive. The Bragg grating reflected peak position was continually monitored with the FiberPro system during the application and cooling of the polyolefin tubing.

Figure 8:
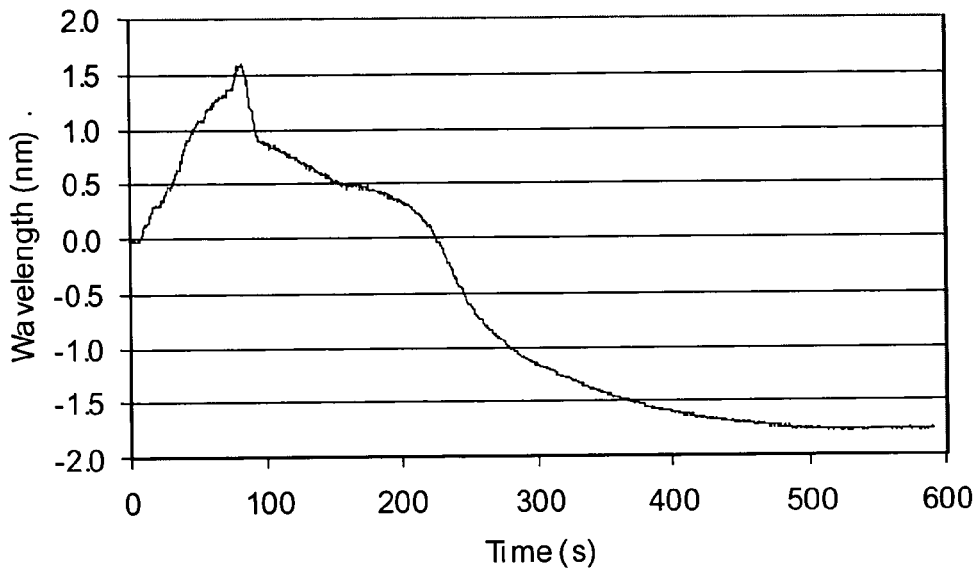
FIG. 8 is a plot of the wavelength change over time for a Bragg grating upon coating with adhesively bonded polyolefin tubing.

The change in the reflected wavelength peak position as a function of time is given in FIG. 8. As shown therein, the initial positive rise in the reflected wavelength response is due to thermal sensitivity (response) of the sensor within the polyolefin tubing. The sensor response changes direction due to sensor cooling upon removing the heat source. The thermal plastic adhesive bonds the optical fiber sensor to the polyolefin at an elevated temperature. The high CTE of the polyolefin tube relative to that of the fused silica fiber optic sensor produces higher contractions in the polyolefin than the fiber optic sensor. This mismatch of CTE and the restraining effect of the thermal plastic adhesive produce residual compressive stresses in the optical fiber. The difference between the initial and final reflected wavelengths is due to the compressive strain associated with the contraction of the polyolefin material.

Example 2

Residual stresses were produced between a polymer coating and an optical fiber sensor. Coatings were prepared using a polymer matrix containing a range of particulate additives including TERFENOL-D powder from Etrema Products, Inc. and iron fines. The particulate were approximately 25% volume fraction of the coating system. The TERFENOL-D powder particle sizes were less than 300 μm. The iron powder had a particle size less than 40 mesh (425 μm).

Optical fiber sensors including Bragg gratings (commercially available from Luna Innovations, Inc.) were coated with Spurr Low-Viscosity Embedding Media a four-part epoxy from Polysciences, Inc. This epoxy was used as the matrix material for these coatings. The approximately 2 mm thick coatings were cured at 70° C. for 16 hours. The total change in the reflected wavelengths of the coated optical fiber sensors were recorded for the four part epoxy with iron fines and TERFANOL-D particles. The reflected wavelength decreased by 1.5 to 3 nm for the coated optical fiber sensor relative to the uncoated condition. Application of the epoxy polymer produced compressive stresses in the optical fiber based sensor.

Example 3

Wear tests were performed by mounting the polyolefin tube and Bragg sensor assembly described in Example 1 in a metallographic epoxy mount which was cast in a cylindrical mold. A V-shaped groove was machined into the mount and the fiber Bragg grating in the polyolefin tube was placed into the groove. A five minute epoxy was used to fill in the groove around the damage sensor. Silicon carbide 180 grit abrasive paper was used to generate flat parallel surfaces on both ends of the metallographic mount. All grinding was performed using deionized water as a lubricant to minimize heating of the sample. The face of the mount containing the insulation damage sensor was ground down to expose the polyolefin tube. Digital calipers were used to measure the thickness of the mount. To minimize temperature effects, the mount was placed in 500 ml of deionized water at room temperature. Once the mount equilibrated with the water temperature, the reflected Bragg peak position (wavelength) was recorded. The mount was then further ground and the thickness and peak position re-measured. This process was repeated until the fiber was exposed. The reflected peak position was plotted as a function of the change in thickness of the polyolefin insulation.

Figure 9:
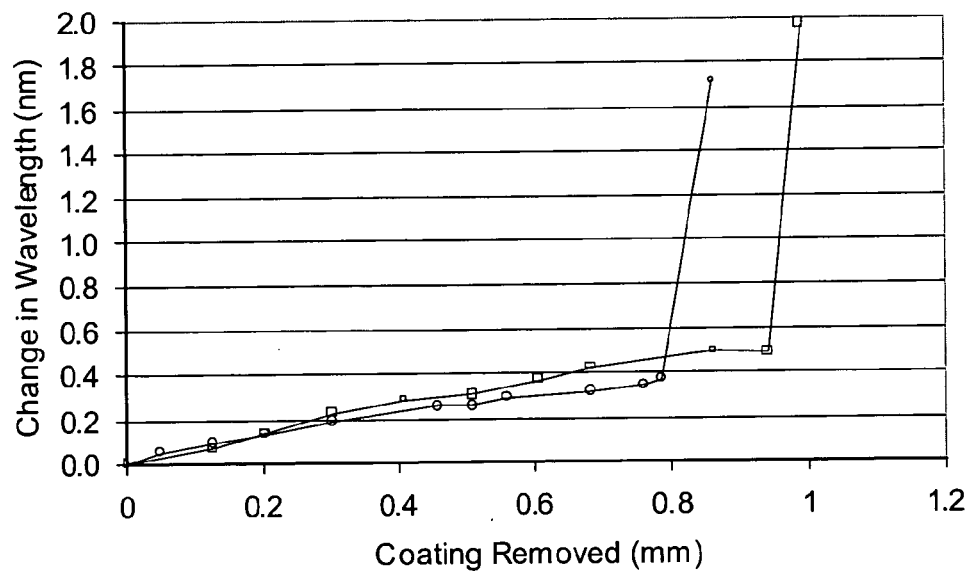
FIG. 9 is a plot of the change in reflected peak position of an optical fiber Bragg grating in polyolefin tubing due to wear as a function of the thickness of the tube removed for two replicate tests.

The data traces for two replicate tests are provided in FIG. 9. As demonstrated, the wear process relieved the compressive stress on the sensor resulting in a positive sensor response. The wear sensor was developed to take advantage of the large change in peak position that is achieved when the fiber Bragg grating is adhered to a polymer coating at an elevated temperature. Strain in the fiber is developed during the incorporation of the fiber into the insulating material. The mismatch in coefficients of thermal expansion (CTE) between the optical fiber and the polymeric insulation produce stress in the fiber. It was observed that the wavelength change in the adhered Bragg grating is approximately −2.2 to −2.6 nm, relative to the initial non-adhered zero state. The positive change in reflected peak position as insulation (polyolefin tube) is removed by wear processes is due to the relaxation of compressive fiber strain as the cross sectional area of the insulation is decreased (FIG. 9).

Example 4

Figure 10:
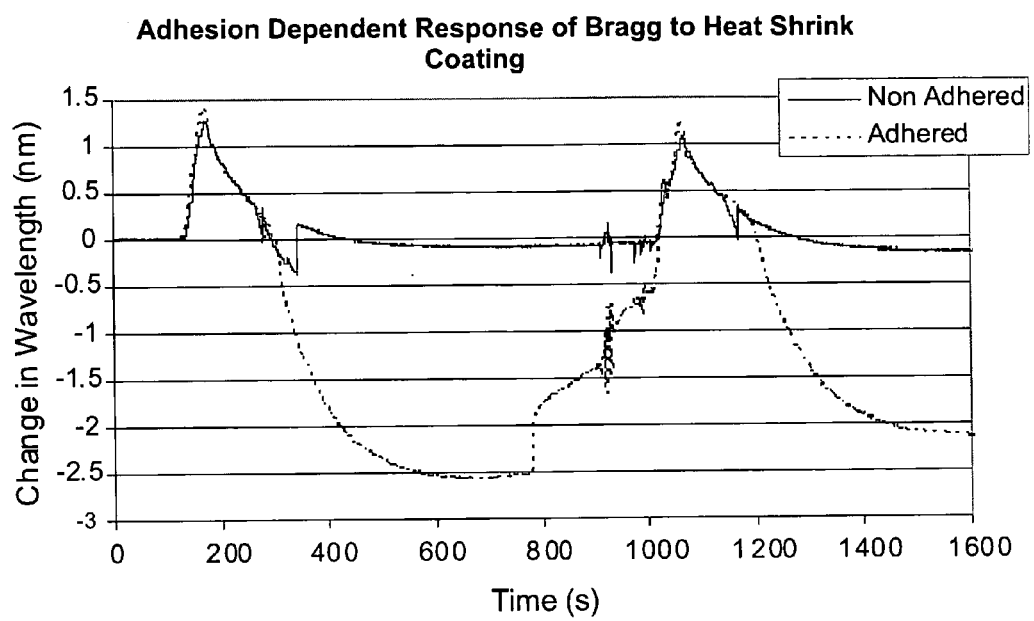
FIG. 10 is a plot showing the response of Bragg sensors adhered and non-adhered to polyolefin tube subjected to two thermal cycles.

To differentiate thermal effects from wear, two Bragg grating sensors were coated within the same polyolefin tubing. The first Bragg sensor was covered with a TEFLON® fluoropolymer sheath to minimize the adhesion and compressive residual stress of the optical fiber sensor. The purpose of this sensor covered with the TEFLON® fluoropolymer sheath was to provide a temperature baseline. A second sensor was coated directly with the polyolefin material to monitor damage using the methods described in Example 1. The response of each optical sensor during the coating process and second thermal cycle is shown in FIG. 10. As shown therein, the adhered damage sensor responded as shown previously in FIG. 8, with a significant offset due to the resultant compressive residual stress. The non-adhered temperature sensor responded primarily to the thermal effects. The sharp changes in the temperature sensor response were due to the release of built-up compressive strains.

Example 5

Figure 11:
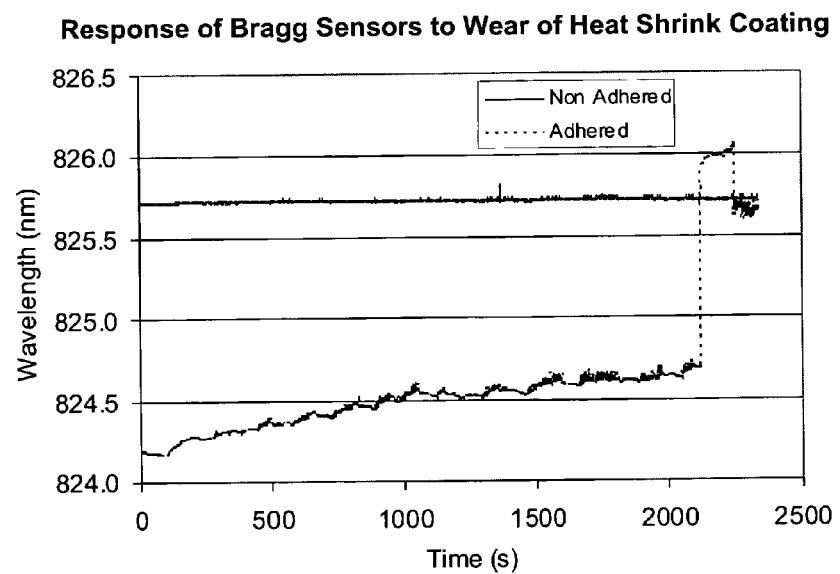
FIG. 11 is a plot showing the response of adhered (wear) and non-adhered (temperature) coated Bragg sensors within the same insulation subjected to wear damage.

The polyolefin coated temperature and damage Bragg sensors of Example 4 were then tested for response to mechanical wear. As in Example 3, the polyolefin coated sensors were mounted to a polishing fixture and ground to simulate wear. The response from the sensors is shown in FIG. 11. The response of the damage sensor under mechanical stress and the isolation of the temperature sensor is clearly demonstrated in the plots of FIG. 11.

Example 6

An optical fiber sensor containing multiple Bragg gratings was incorporated into an insulating polyolefin tube. Wire insulation was simulated by a 1 meter long semi-rigid adhesively lined polyolefin heat shrink tubing (3M Corporation). Initial wire insulation tests were conducted using the DSS 1550™ system (Luna Innovations) to monitor multiple distributed optical fiber Bragg gratings. The fiber was cleaned with isopropyl alcohol and then a thin coating of cyanoacrylate adhesive was applied to promote adhesion between the fiber and the polyolefin tubing. Approximately 1 meter of optical sensing fiber containing Bragg gratings spaced at 1 cm intervals was then placed into the adhesively lined polyolefin tubing. A heat gun was used to shrink the tubing and melt the thermoplastic adhesive lining. At the peak temperature, the tubing was compressed to push entrapped air out of the tube and fully wet the fiber with the thermoplastic adhesive.

Figure 12:
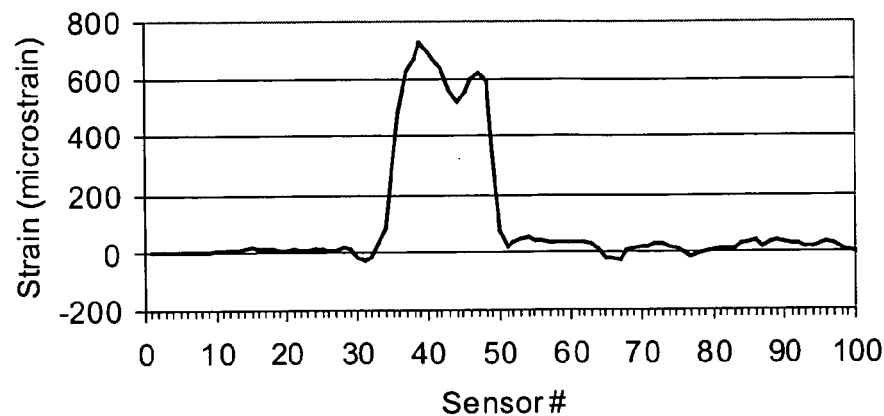
FIG. 12 is a plot of the wavelength change as a function of position for a distributed sensor system adhered to a polyolefin insulator subjected to tensile loading.
Figure 13:
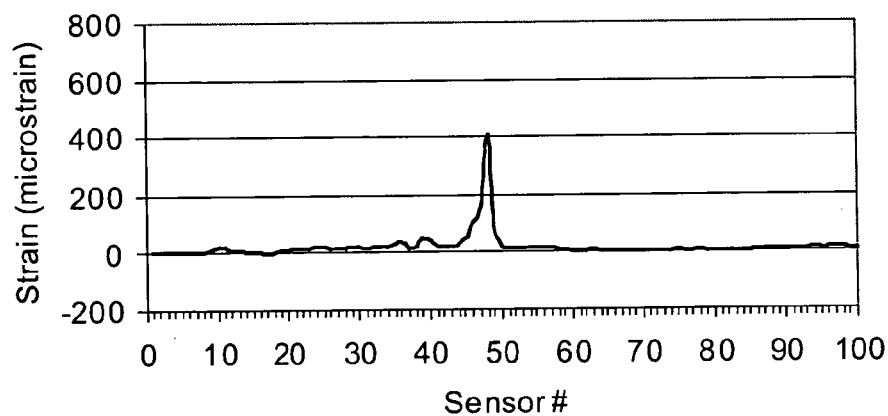
FIG. 13 is a plot of the wavelength change as a function of position for a distributed sensor system adhered to a polyolefin insulator subjected to a wear damage event.
Figure 14:
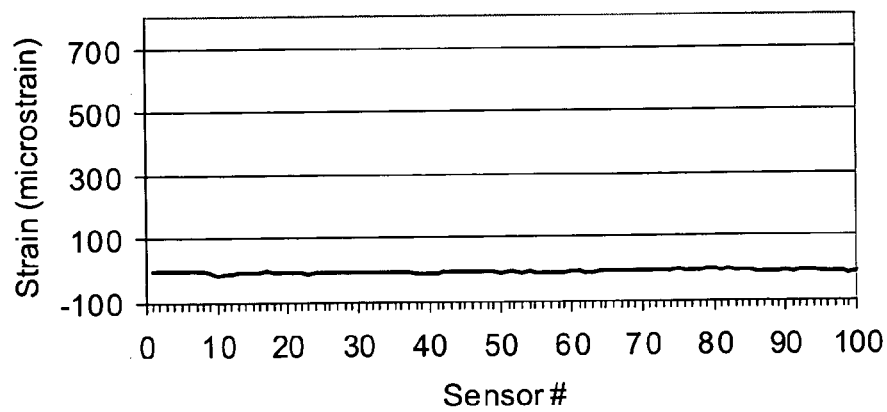
FIG. 14 is a plot of the wavelength change as a function of position for a distributed sensor system adhered to a polyolefin insulator subjected to a wear damage event and zeroed to monitor the occurrence of damage relative to a new baseline state.

The simulated 1 meter long wire was subject to a range of potentially damaging loads and actual insulation damage given in FIGS. 12–14. FIG. 12 presents the output from the sensing fiber containing distributed Bragg gratings loaded in tension from approximately Bragg sensor number 35 to 50. When the tensile load is removed the sensors return to the original zero condition.

The simulated 1 meter long wire was subject to a permanent damage event by cutting the polyolefin tubing with a scalpel. The damage state was detected and the distributed sensor and sensor system output is provided in FIG. 13. The damage condition given in FIG. 13 is a permanent change is state. If it is desired the new state of the 1 meter long wire can be used as a new baseline provided in FIG. 14. This effectively re-zero the system so that new conditions or damage states are measured relative to the new baseline.

Example 7

Figure 15:
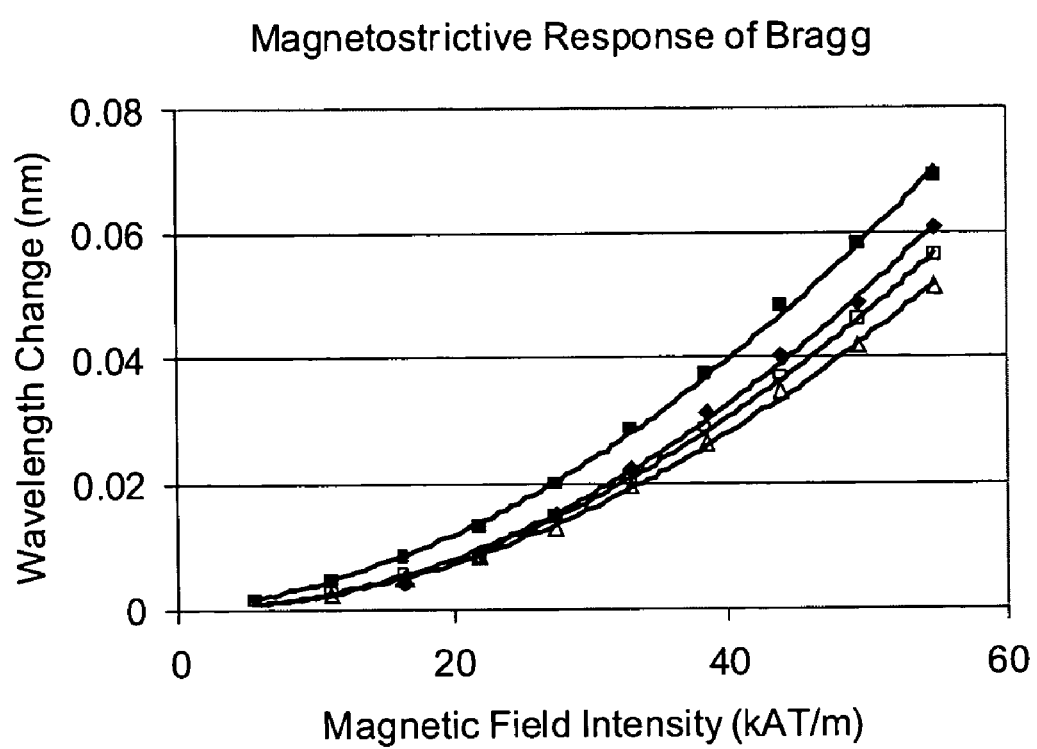
FIG. 15 is a plot of the response of a Bragg sensor with a coating containing magnetostrictive particles in magnetic fields of varying strength.

The optical fiber Bragg sensors of Example 2 were exposed in a magnet coil to varying magnetic field intensities of up to 55 kAT/m. FIG. 15 gives the output of the fiber optic Bragg sensor for a range of magnetic field intensities. The four tests were performed for these sensors coated with TERFENOL-D and epoxy coatings.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A composite structure comprising:
   a coated element, and
   at least one fiber optic condition sensor embedded physically within a coating of said coated element, wherein
   the at least one fiber optic condition sensor exhibits an initial wavelength at a zero state prior to being embedded physically within the coating, and wherein
   each of the coating and the at least one fiber optic condition sensor has a coefficient of thermal expansion (CTE) which is sufficiently different from one another so as to induce compressive stress on the at least one fiber optic condition sensor to achieve a wavelength change thereof during a normal state which is greater than about 0.1 nm relative to the initial wavelength of the at least one fiber optic condition sensor at the zero state to thereby achieve a predetermined strain characteristic which is responsive to a selected condition of the composite structure to be sensed, and wherein
   said sensor detects a change in the predetermined strain characteristic which is indicative of the condition of said composite structure during an abnormal condition due to the induced compressive stress achieved by the different CTE of the coating and the sensor.

2. The structure of claim 1, wherein said coating is a polymeric coating, and wherein said element is an electrical conductor, and wherein the polymeric coating and the at least one fiber optic condition sensor have different coefficients of thermal expansion so as to impart said predetermined strain characteristic.

3. The structure of claim 1 or 2, wherein said at least one fiber optic condition sensor comprises a series of axially spaced apart Bragg gratings written therein.

4. The structure of claim 1, comprising a plurality of said fiber optic condition sensors each embedded in said coating.

5. The structure of claim 4, wherein each of said fiber optic condition sensors comprises a series of axially spaced apart Bragg gratings written therein.

6. The structure of claim 4 or 5, wherein at least one of said fiber optic condition sensors detects the change in the strain characteristic so as to sense a condition of the structure other than a temperature condition, and wherein at least one other fiber optic sensor detects a temperature condition of said structure.

7. The structure of claim 1, wherein the coating is a magnetorestrictive coating, and wherein said at least one fiber optic condition sensor detects a change in the strain characteristic in response to the presence of the structure in a magnetic field.

8. A condition detection system comprising:
   a composite structure comprised of a coated element, and at least one fiber optic condition sensor embedded physically within a coating of said coated element, wherein the at least one fiber optic condition sensor exhibits an initial wavelength at a zero state prior to being embedded physically within the coating, and wherein each of the coating and the at least one fiber optic condition sensor has a coefficient of thermal expansion (CTE) which is sufficiently different from one another so as to induce compressive stress on the at least one fiber optic condition sensor to achieve a wavelength change thereof during a normal state which is greater than about 0.1 nm relative to the initial wavelength of the at least one fiber optic condition sensor at the zero state to thereby achieve a predetermined strain characteristic which is responsive to a selected condition of the composite structure to be sensed, and wherein said sensor detects a change in the predetermined strain characteristic which is indicative of the condition of said composite structure during an abnormal condition due to the induced compressive stress achieved by the different CTE of the coating and the sensor,
   a data acquisition system operatively connected to said fiber optic sensor for outputting a signal indicative of the change in the predetermined strain characteristic of the at least one fiber optic condition sensor, and
   a monitor for receiving the signal and providing an indication of said predetermined condition.

9. The system of claim 8, wherein said monitor provides a visual and/or aural indication of said predetermined condition.

10. The system of claim 8, wherein said monitor stores data associated with said predetermined condition.

11. A wire assembly having integral condition detection capabilities, comprising:
    a wire element which includes at least one electrical conductor;
    an electrical insulator formed of a polymeric material surrounding said wire element; and
    a fiber optic condition sensor in operative association with said electrical insulator to detect a selected condition of said wire assembly, wherein
    the fiber optic condition sensor exhibits a predetermined strain characteristic which is responsive to the selected condition of the wire assembly to be detected, and wherein
    the fiber optic condition sensor detects a change in the predetermined strain characteristic which is indicative of the selected sensed condition of said wire assembly; and wherein
    the fiber optic condition sensor exhibits an initial wavelength at a zero state prior to being operatively associated with the electrical insulator, and wherein
    each of the electrical insulation and the fiber optic condition sensor has a coefficient of thermal expansion (CTE) which is sufficiently different from one another so as to induce compressive stress on the fiber optic condition sensor to achieve a wavelength change thereof during a normal state which is greater than about 0.1 nm relative to the initial wavelength of the fiber optic condition sensor at the zero state to thereby achieve the predetermined strain characteristic which is responsive to the selected condition of the wire assembly to be detected, and wherein the sensor detects a change in the predetermined strain characteristic which is indicative of the condition of the wire assembly during an abnormal condition due to the induced compressive stress achieved by the different CTE of the electrical insulation and the sensor.

12. The wire assembly as in claim 11, wherein said fiber optic condition sensor is embedded physically within said electrical insulator.

13. The wire assembly as in claim 11, wherein said wire element includes a plurality of electrical conductors, and wherein said fiber optic condition sensor is associated physically with said plurality of electrical conductors so as to be surrounded by said electrical insulator.

14. The wire assembly of claim 11, comprising a plurality of fiber optic condition sensors each in operative association with said electrical insulator and each having a series of axially spaced apart Bragg gratings written therein for detecting the change in the predetermined strain characteristic indicative of the selected sensed condition of the wire assembly.

15. The wire assembly of claim 11, wherein the fiber optic condition sensor is oriented substantially parallel to or spirally wound around the electrical conductor.

16. The wire assembly of claim 11, wherein the polymeric material is extruded as a coating onto the electrical conductor.

17. The wire assembly of claim 11, wherein the polymeric material is a heat-shrunk tube, tape wrap or woven sleeve.

18. The wire assembly of claim 11, wherein the polymeric material is a polyolefin, polytetrafluoroethylene, fluorinated ethylene propylene, polyvinylidene fluoride, ethylene-tetrafluoroethylene, or polyimide.

19. The wire assembly of claim 18, wherein the polymeric material is a heat shrunk tube, tape wrap or woven sleeve.

20. An insulation wear detector system comprising:
a wire assembly comprising a wire element which includes at least one electrical conductor; an electrical insulator formed of a polymeric material surrounding said wire element; and a fiber optic condition sensor in operative association with said electrical insulator, wherein the fiber optic condition sensor exhibits a predetermined strain characteristic which is responsive to a wear condition of the electrical insulator, and wherein the fiber optic condition sensor detects a change in the predetermined strain characteristic which is indicative of the wear condition of said electrical insulator;
a data acquisition system operatively connected to said fiber optic sensor for outputting a signal indicative of a change in the predetermined strain characteristic of the fiber optic sensor, and
a monitor for receiving the signal and providing an indication of the wear condition of the electrical insulator; wherein
the fiber optic condition sensor exhibits an initial wavelength at a zero state prior to being operatively associated with the electrical insulator, and wherein each of the electrical insulation and the fiber optic condition sensor has a coefficient of thermal expansion (CTE) which is sufficiently different from one another so as to induce compressive stress on the fiber optic condition sensor to achieve a wavelength change thereof during a normal state which is greater than about 0.1 nm relative to the initial wavelength of the fiber optic condition sensor at the zero state to thereby achieve the predetermined strain characteristic which is responsive to the selected condition of the wire assembly to be detected, and wherein the sensor detects a change in the predetermined strain characteristic which is indicative of the condition of the wire assembly during an abnormal condition due to the induced compressive stress achieved by the different CTE of the electrical insulation and the sensor.

21. The system of claim 20, wherein said monitor provides a visual and/or aural indication of said predetermined change in strain.

22. The system of claim 20, further comprising at least one other said fiber optic condition sensor for detecting a temperature condition of the wire assembly and for outputting a temperature signal indicative of the temperature condition of the wire assembly.

23. The system of claim 22, wherein the data acquisition system receives the temperature signal and compares the temperature signal to the signal indicative of the wear condition of the electrical insulator.

24. A magnetic field strength sensor assembly comprising:
a magnetorestrictive coating material, and
at least one fiber optic condition sensor associated physically with the magnetorestrictive coating material, wherein the at least one fiber optic condition sensor exhibits an initial wavelength at a zero state prior to being associated physically with the magnetorestrictive coating material, and wherein
each of the magneto restrictive coating material and the at least one fiber optic condition sensor has a coefficient of thermal expansion (CTE) which is sufficiently different from one another so as to induce compressive stress on the at least one fiber optic condition sensor to achieve a wavelength chance thereof during a normal state which is greater than about 0.1 nm relative to the initial wavelength of the at least one fiber optic condition sensor at the zero state to thereby achieve a predetermined strain characteristic which is responsive to exposure to a magnetic field, the magnetorestrictive coating material thereby inducing a strain characteristic on the at least one fiber optic condition sensor in response to exposure to the magnetic field such that the sensor detects the strain characteristic which is indicative of magnetic field strength.

25. A system for detecting magnetic field strength comprising a sensor assembly as in claim 24, a data acquisition system operatively connected to said fiber optic sensor for outputting a signal indicative of the detected strain characteristic induced by the magnetic field, and a monitor for receiving the signal and providing an indication of magnetic field strength.

* * * * *